United States Patent
McFarland (10) Patent No.: US 7,746,887 B2
(45) Date of Patent: Jun. 29, 2010

(54) DYNAMIC VALUE REPORTING FOR WIRELESS AUTOMATED SYSTEMS

(75) Inventor: Norman R. McFarland, Palantine, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 1112 days.

(21) Appl. No.: 11/402,743

(22) Filed: Apr. 12, 2006

(65) Prior Publication Data

US 2007/0242688 A1   Oct. 18, 2007

(51) Int. Cl.
*H04L 12/413* (2006.01)
(52) U.S. Cl. ...................... 370/455; 370/316
(58) Field of Classification Search ....................... None
See application file for complete search history.

(56) References Cited

U.S. PATENT DOCUMENTS

2003/0174070 A1*  9/2003  Garrod et al. .......... 340/870.07
2005/0078672 A1   4/2005  Caliskan

* cited by examiner

*Primary Examiner*—Lester Kincaid
*Assistant Examiner*—Phuoc Doan
(74) *Attorney, Agent, or Firm*—Thomas J. Burton (57) ABSTRACT

A wireless automation device monitors a condition and wirelessly reports an event over an automation network in response to detecting a change in the condition. The condition is sampled at a variable periodic interval, and the event reported during intervals when a change in the condition is determined. The change may be determined according to detecting a value for the condition outside a variable range. The change may also be determined according to detecting differences in the value from values detected in prior intervals. The range and the periodic interval may vary according to an analysis of multiple samples of the condition.

21 Claims, 4 Drawing Sheets

DYNAMIC VALUE REPORTING FOR WIRELESS AUTOMATED SYSTEMS

BACKGROUND

The invention relates to remote monitoring of conditions and more particularly to wirelessly reporting a sensed condition over a wireless communication network.

Automation systems include one or more distributed components and/or grouping of components that together form an integrated system for automating a process control. The components include controllers, sensors, switches, alarms, actuators, chillers, fans, humidifiers, and/or air handling units configured to automate process control for heating, ventilation, air conditioning (HVAC), environmental air quality, safety and security, fire, hazard prevention, or other processes for a building or facility. The devices may communicate information over a wired network and/or by wirelessly broadcasting information between and among the components.

The components may detect events, sense conditions, respond to detected events or changes in conditions, and/or control operation of other devices. An event may be detected by a sensor, which communicates related information to a controller. The controller generates control signals, which are communicated to a device for an appropriate responsive action. For example, a temperature sensor wirelessly broadcasts a temperature reading to a controller. The controller reads the information from the sensor and determines whether a responsive control action may be taken. The controller communicates a control signal, as appropriate, to an actuator to control airflow in the room. The controller also may communicate a feedback or status signal to a remote computer.

Wireless networks are limited by the amount of available bandwidth over which the devices may communicate. The number of devices and amount of information communicated over a wireless system may be constrained by the available bandwidth. Systems having many wireless devices may create a noisy environment in which data can be lost, dropped or not communicated with the targeted recipient. The continuous monitoring of conditions and broadcast of information consumes larges amounts of power, which may shorten a limited-lifetime power source. The continuous stream of information from and to devices uses a great amount processing power for a controller, and may provide redundant information that may need to be filtered before being processed.

Accordingly, there is a need for a system for reducing an amount of communication over a wireless automated system using dynamic value reporting.

BRIEF SUMMARY

The described embodiments include methods, processes, apparatuses, and systems for reporting information over a wireless automation system, and particularly to a wireless building automation system. An automated wireless system using dynamic value reporting provides for a robust process control that minimizes an amount of communications in the wireless network. The amount of wireless traffic in the system may be reduced, and/or the number of devices communicating over a wireless network increased, by minimizing or reducing the amount of information reported by a sensor.

Conditions are monitored, or sensed, during a variable periodic interval to determine whether a measurement for the condition has changed, is above, and/or below a limit or within or outside a range. The measurement may also be compared to measurements made during prior intervals, and/or statistics determined based on prior readings. A statistical analysis of the measurement may be made, and an appropriate control response determined and executed. The measurement, the change over a prior measurement, and/or the results of a comparison to a limit and/or range may be made according to a second periodic interval. The second periodic interval may coincide with the first periodic interval.

In an embodiment, a wireless automation device includes a wireless transceiver, such as a RF transceiver, RF transmitter, and/or RF receiver or other device that wirelessly communicates packets of information over a wireless network. A sensor generates a signal based on whether a sensed condition is within a predetermined range. In the device, a controller polls the sensor at a variable periodic interval to read the signal from the sensor. The sensor may be continuously activated, or may be activated upon a polling by the controller. The controller also controls the transceiver to selectively communicate information associated with the signal from the sensor. The information is transmitted during a variable periodic interval for transmitting the information. The information may be transmitted in response a change in a sensed condition, in response to a sensed condition being outside a predetermined range or limit, and/or in response to an externally received control signal. Transmission of information during an interval may be suspended in response to an externally received control signal. The controller and/or sensor may enter a stand-by or sleep mode during times other than the variable periodic interval.

The present invention is defined by the following claims. Nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

DESCRIPTION OF THE PRESENTLY PREFERRED EMBODIMENTS

A wireless automation system configured for or using dynamic value reporting communicates data among and between devices related to changes in a value of a monitored condition and/or measured parameter (e.g., a wireless sensor for monitoring environmental temperature). A wireless automation device using dynamic value reporting monitors and wirelessly reports building automation information over a building automation network formed by multiple distributed devices. The distributed devices communicate information between and among the devices from a source device to a destination device.

A device that uses dynamic value reporting senses, samples and/or measures a condition during a period of a sampling or polling interval. A reading of the condition may be taken to identify an indicator associated with the current or present condition. The indicator of the current or present condition may be read during a current period of the sampling interval. The current reading of the indicator may be stored with prior readings of the indicator in a memory. The current readings and prior readings may be stored in memory in order in which the readings were read, such as in a stack manner. The current reading of the indicator also may be compared to prior readings of the indicator to determine a change. The indicator and/or the change may be compared to a limit or range, such as an absolute limit and/or a range for changes from one or more previous measured values.

The device wirelessly receives and transmits information over the network. The information may include a current indicator of the condition, a value or status for the condition and/or sensor, and/or the comparison of the indicator to a limit or range, the time or interval sequence number in which an indicator was made, the time or interval sequence in which an indicator is deemed to have changed beyond a limit or outside a range and like information. The information is routed as packets, such as according to a TCP/IP transmission protocol. The information is communicated to destination device, such as an actuator, and/or a controller that executes a process control such as executing a responsive action, and/or communicating an appropriate control signal. The device may communicate information during a period of a transmission interval. The device may communicate information during a transmission, or communication, interval. The information may be communicated in response to a comparison that identifies a change in the sensed condition, such as a change outside a band limit, or a reading of the indicator beyond a limit. Similarly, a transmission of information may be suspended for periods of a transmission interval for which no change in the indicator has been identified. The device may enter a sleep mode, or go into a standby mode, between periods of the transmission and/or polling interval. The transmission and polling intervals, the limits and ranges may be changed, varied, regulated, adjusted, extended and/or compressed according to the measured values and/or comparison to the limits.

Figure 1:
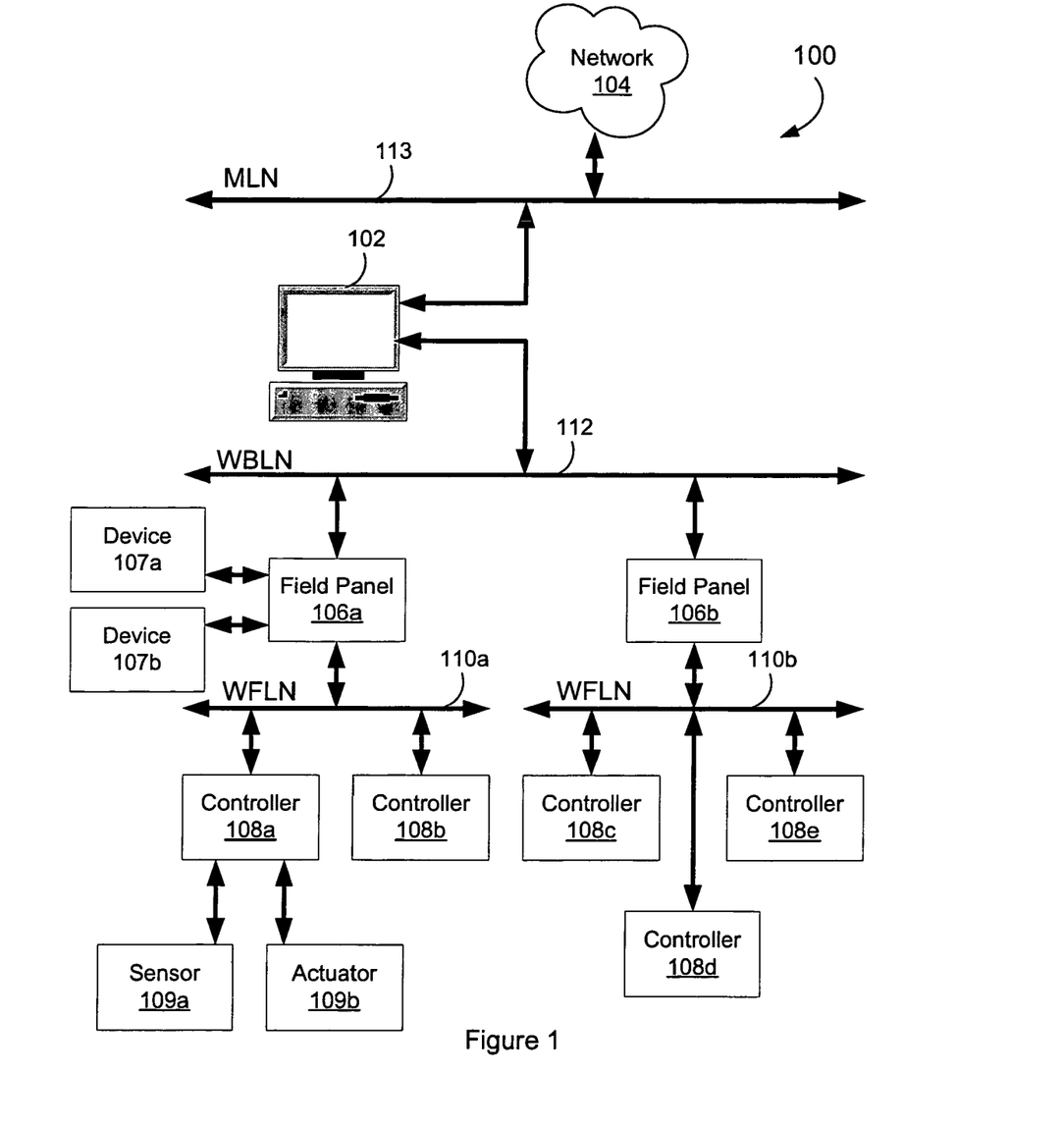
FIG. 1 is an example of a wireless automated system for building automation.

FIG. 1 illustrates a block diagram for an example of a wireless automation system 100 configured for and/or using dynamic value reporting. The illustrated wireless automation system 100 automates a building control process for heating, ventilation, and air conditioning (HVAC) for one or more buildings and/or facilities. In an embodiment, the building automation system may be an APOGEE™ system provided by Siemens Building Technologies, Inc. of Buffalo Grove, Ill. The wireless automation system 100 using dynamic value reporting may be any of a variety of other automation systems, including air quality systems, industrial control systems, security and loss prevention systems, hazard detection and/or prevention systems, lighting systems, combinations and integrations thereof, and the like.

The automation system 100 provides process control functionality for one or more building, or facility operations. The automation system 100 includes one or more devices positioned, or distributed, throughout the building. The devices generate and/or receive information related to a specific event, condition, status, acknowledgement, control, combinations thereof and the like. The devices may also respond to control commands and/or execute an instruction received by or in a signal. The devices may also communicate or route the information between and among components of the system from a source to a destination.

The automation system 100 shown in FIG. 1 is a multi-tier architecture having a high-speed or high bandwidth communications level that includes aggregate collections of sensor and/or actuator data, video or other high bandwidth data or long range communications and a level for point-to-point communication between devices. The devices may be field panels, controllers, sensors, actuators and any other component of an automation system. Control processes are distributed to the field panels, controllers, sensors and actuators as appropriate for the particular operations or functions of the device.

The devices of the system 100 communicate information, data and commands according to an assigned binding association. That is, devices may be commissioned as an operating pair or group according to a binding association. Even though devices may be commissioned as an operating pair or group, communications between devices may be routed, or hopped, via one or more other devices of the network. That is, the communication of information between and among devices includes transmitting, routing, and/or information hopping using low-power wireless RF communications across a network defined by the devices. Multiple paths from a source to a destination may exist in the network.

A sensing device monitors a condition and/or status of an event. The sensing device may report appropriate sensor information, such as a current value or indicator of the condition, timing of a reading, prior measurements, status of the sensor and/or a comparison of a measured value to a desired limit, range or a previous measurement. Actuators may process sensor information to determine an appropriate action for the actuator. Controllers monitor the process or action of sensors and actuators, and may override the sensor and/or actuators to alter processing based on a regional or larger area control process.

The automation system 100 includes a supervisory control system or workstation 102, one or more field panels 106a, 106b, and one or more controllers 108a-108e. Each controller 108a-108e, for example, corresponds to an associated localized, standard building control subsystem such as a space temperature control, air quality control, lighting control, hazard detection, security, combinations thereof, or the like. The controllers 108a-108e communicate with one or more sensors 109a using two-way wireless communication protocol. The controllers 108a-108e also may communicate information with one or more actuators 109b using two-way wireless communication protocol. For example, sensor 109a and actuator 109b are commissioned to communicate data and/or instructions with the controller 108a. Sensor 109a may also communicate information directly with actuator 109b using two-way wireless communications.

The controller 108a provides control functionality of each, one, or both of the sensor 109a and the actuator 109b. Controller 108a controls a subsystem based on sensed conditions and desired set point conditions. The controller 108a controls the operation of one or more actuators in response to an event reported by a sensor 109a. The controller 108a may drive the one or more actuator to a desired set point.

The controller 108a is programmed with the set points and a code setting forth instructions that are executed by the controller for controlling the actuators to drive the sensed condition to be with the set point. For example, the actuator 109b is operatively connected to an air conditioning damper and sensor 109a may be a room temperature sensor that reports information related to a temperature being monitored by the sensor. The sensor may report current temperature or a relative temperature change compared to a prior measurement. If the temperature sensed by the sensor 109a exceeds a threshold, the actuator may respond accordingly to open a damper, allowing air conditioning to flow into a room. The sensor 109a may communicate the sensed condition to the actuator 109b and/or to the controller 108a, which thereafter provides an appropriate control signal to the actuator 109a.

Sensor, actuator, and set point information may be shared among or common to, controllers 108a-108e, field panels 106a-106b, work station 102, and any other components or elements that may affect control of the building automation system 100. To facilitate sharing of information, groups of subsystems such as those coupled to controllers 108a and 108b are organized into wireless field (or floor) level networks ("WFLN's") and generally interface at least one field panel 106a. Controllers 108c, 108d and 108e along with the field panel 106b also may communicate via a low-level WFLN data network 110b.

The WFLN data networks 110a 110b are low-level data networks that may use any suitable proprietary or open protocol. The devices forming a WFLN communicate via two-way radio links. Interfaces, routers and bridges are provided for implementing the WFLN 110a and 110b. While shown as a common bus or interconnection structure, the WFLN may include multiple or different communication links between components with some or no redundancy in any of various patterns.

Any of a wide variety of WFLN architectures may be used. For example, the devices of the WFLN may utilize a wireless MESH technology to form a MESH network. For example, the WFLN configured as a wireless MESH network include multiple nodes that communicate via wireless communication links. The MESH network establishes a grid of nodes that create redundant paths for information flow between and among the nodes. In the MESH network, information may reach a destination either by a direct point-to-point communication or by an indirect communication where the information is routed or hops from node to node, among different paths from a source to the destination. The WFLN may be self-forming and/or self-healing. The WFLN also allows bi-directional routing for command and control information. Additional, different or fewer networks may be provided. For example, a WFLN may be wired, while other networks may be wireless, one or both wireless networks include wired components, or the networks may be distributed among only one, three or more levels.

The WFLN's 110a and 110b operate in accordance with distinguishable or the same wireless communications protocols. For example, the WFLN 110a operates pursuant to the 802.15.4 communications protocols, but IEEE 802.11x (e.g., 802.11a 802.11b, 802.11c . . . 802.11g), Wi-Fi, Wi-Max, Bluetooth, ZigBee, Ethernet, proprietary, standard, now known or later developed wireless communication protocols may be used. The WFLN 110b may operate using the same or different protocol as the protocol employed by WFLN 110a. Any now known or later developed network and transport algorithms may be used. Communication, transport and routing algorithms are provided on the appropriate devices. Any packet size or data format may be used.

The field panels 106a and 106b coordinate communication of data, information and signals between the controllers 108a-108e and the workstation 102 and network 104. In addition, one or more of the field panels 106a and 106b may control devices such as HVAC actuators 107a and 107b. The field panels 106a and 106b accept modification, changes, alterations, and the like from the user with respect to objects defined by the building automation system 100. The objects are various parameters, control and/or set points, port modifications, terminal definitions, users, date/time data, alarms and/or alarm definitions, modes, and/or programming of the field panel itself, another field panel, and/or any controller in communication with a field panel.

The field panels 106a and 106b may communicate upstream via a wireless building level network ("WBLN") 112 to the workstation 102. The workstation 102 includes one or more supervisory computers, central control panels or combinations thereof. The workstation 102 provides overall control and monitoring of the building automation system 100 and includes a user interface. The workstation 102 further operates as a building control system data server that exchanges data with one or more components of the building automation system 100. The workstation 102 may also allow access to the building control system data by other applications. The applications are executed on the workstation 102 or other supervisory computers that may be communicatively coupled via a management level network (MLN) 113.

The workstation provides user access to components of the building automation system 100, such as the field panels 106a and 106b. The workstation 102 accepts modifications, changes, and alterations to the system. For example, a user may use the workstation 102 to reprogram set points for a subsystem via a user interface. The user interface may be an input device or combination of input devices, such as a keyboard, voice-activated response system, a mouse or similar device. The workstation 102 may affect or change operations of the field panels 106a and 106b, utilize the data and/or instructions from the workstation 102, and/or provide control of connected devices, such as devices 107a and 107b and/or the controllers 108a and 108b. The field panels 106a and 106b therefore accept the modifications, changes, alterations and the like from the user.

The workstation 102 may process data gathered from the field panels 106a and 106b and including maintain a log of events and conditions. Information and/or data are gathered in connection with the polling, query or otherwise. The workstation 102 maintains a database associated with each field panel 106a and 106b, controllers 108a-108e, and sensor 109a, actuator 109b, controller 108d and devices 107a and 107b. The database stores or records operational and configuration data.

The workstation 102 may be communicatively coupled to a web server. For example, the workstation 102 may be coupled to communicate with a web server via the MLN 113 through a network 104 such as an Ethernet network, a LAN, WLAN, or the Internet. The workstation 102 uses the MLN 113 to communicate building control system data to and from other elements on the MLN 113. The MLN 113 is connected to other supervisory computers, servers, or gateways through the network 104. For example, the MLN 113 may be coupled to a web server to communicate with external devices and other network managers. The MLN 113 may be configured to communicate according to known communication protocols such as TCP/IP, BACnet, and/or other communication protocols suitable for sharing large amounts of data.

Figure 2:
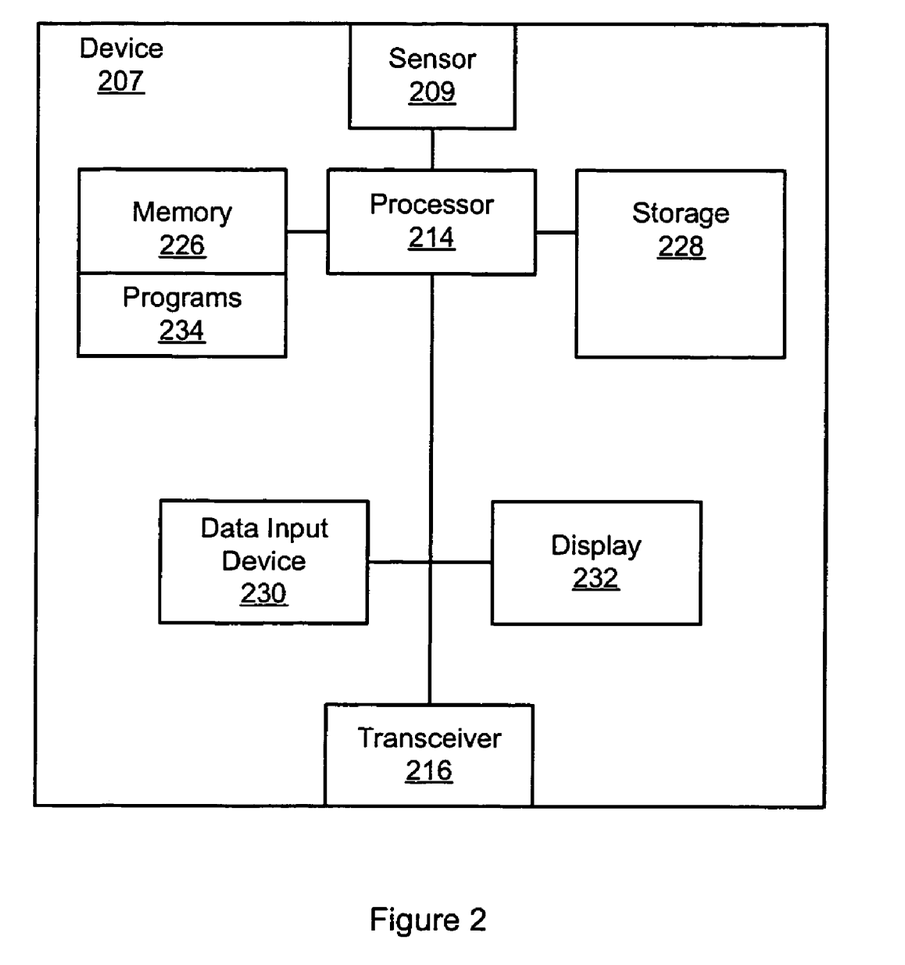
FIG. 2 is a diagrammatic representation for a sensor device.

FIG. 2 illustrate a block diagram of an automation device 207 for a wireless automation system using dynamic value reporting. The automation device 207 provides service functionality. The automation device 207 may be a function-specific device, or configured to provide one or more of a variety of functionalities. In an example, the automation device 207 monitors a condition or parameter and wirelessly reports dynamics in the condition or parameter. The automation device 207 may be a sensor that monitors a condition and/or event, such as a building environment. The automation device 207 may be installed, positioned, and/or located with, within, on, or around a building, facility, a plant, factory, assembly, edifice, structure, colliery, combinations or portions thereof or other environment having conditions to be monitored.

The automation device 207 communicates over a network which may include other automation devices, data processors, desktop computers, a mobile computers, a notebook computers, a tablet computers, controllers, personal computers, workstations, mainframe computers, servers, personal digital assistants ("PDA"), personal communications devices such as a cellular telephone, and like devices configured to communicate information over a communication network. The network may be any known or proprietary network of computers, such as a Local Area Network (LAN), a Wireless LAN (WLAN) a Personal Area Network (PAN), Wireless PAN (WPAN) and a Virtual Private Network (VPN), combinations thereof and the like. The automation device 207 may communicate according to any known or proprietary communication protocols such as TCP/IP, BACnet, and/or other communication protocols suitable for sharing large amounts of data. For example, the automation device 207 is a temperature sensor that monitors and reports information related to a temperature in a room or portion thereof. The sensor 207 reports information related to the temperature between and among devices of a building automation system.

The device 207 includes a processor 214, a transceiver 216, and a sensor 209. Additional, different or fewer components may be provided, such as providing a plurality of different or the same types of sensors. For example, the device may also have a memory 226, a storage device 228, a data input device 230, and a data output 232. A program 234 resides in the memory 226 and includes one or more sequences of executable code or coded instructions. The program 234 may be implemented as computer software, firmware including object and/or source code, hardware, or a combination of software and hardware. The program 234 may be stored on a computer-readable medium, (e.g., storage device 228) installed on, deployed by, resident on, invoked by and/or used by the processor 214. The program 234 is loaded into the memory 226 from storage device 228. Additionally or alternatively, code may be executed by the controller processor 214 from the storage device 228. The program 234 may be implemented using any known or proprietary software platform or frameworks including basic, visual basic, C, C+, C++, J2EE™, Oracle 9i, XML, API based designs, and like software systems.

The processor 214 implements a control process for the device 207. The control process may be implemented based on a signal that is read from and/or provided by the sensor 209, such as a measured value of a parameter, an indicator of a sensed condition and/or status of an event. The processor 214 may be may be one or more devices including a general processor, digital signal processor (DSP), control processor unit (CPU), application specific integrated circuit (ASIC), field programmable gate array (FPGA), analog circuit, digital circuit, combinations thereof or other now known or later developed devices for implementing a control process. The processor 214 has a processing power or capability and associated memory corresponding to the needs of one or more of a plurality of different types of sensors 209 and transceiver 216. The processor 214 implements a control process algorithm specific to the sensor 209. Other control processes may be stored but unused due to a specific configuration.

The processor 214 executes one or more sequences of instructions of the program 234 to process data. Data and/or instructions may be preprogrammed to the device 207 and or provide to the device 207 using the data input device 230. Data and/or instructions may also be received via the transceiver 216. The processor 214 interfaces data input device 230 and/or the transceiver 216 to receive data and instructions. The processor 214 may also interface the storage device 228 for storage and retrieval of data. Data processed by the processor 214 may be stored in and retrieved from in storage device 228, communicated via the transceiver 216, and/or presented via data output device 232. The data output device 232 may be a display, monitor, a printer, a communications port, an array of lights, combinations thereof and the like. For example, the processor may control a light array of the output device 232 to indicate an operation status, or read data status, a transmit status and the like. The light array may be internal to an enclosure for the device, and/or externally visible.

The transceiver 216 is a receiver, transmitter, combination receiver/transmitter, wireless communication port, wireless communication device, wireless modem and like device capable of wirelessly receiving, communicating, transmitting, and/or broadcasting information. In an embodiment, the transceiver 216 may receive and transmit control information from other components or devices. The information may be control information to alter the implemented control process.

The transceiver 216 wirelessly communicates information using one or a combination of one-way and/or two-way wireless communications. The information may be communicated using radio frequency (RF), infra-red (IR), ultra-sound communication, cellular radio-telephone communications, a wireless telephone, a Personal Communication Systems (PCS) and like wireless communication technologies. The transceiver 216 communicate information as packets of information according to one or more communications protocols or standards, including IEEE 802.11(x), 802.16, Wi-Fi, Wi-Max, ZigBee, Bluetooth, Voice Over Internet Protocol (VoIP). The transceiver 216 also or alternatively communicates information and/or packets of information in accordance with known and proprietary network protocols such as TCP/IP, Ethernet and like protocols over a Personal Area Network (PAN), Wireless PAN (WPAN), virtual private network (VPN), Wireless Local Area Network (WLAN) and like networks. The transceiver may also include an interrogator that wirelessly transmits signals to interrogate components of a building automation system. The transceiver also may receive a wirelessly transmitted interrogation signal from one or more other components.

The sensor 209 may include a device or a collection of devices that sense conditions, parameters and/or events such as an environmental condition in a building. The sensor 209 generates information or data related to the sensed or monitored condition. The information may be provided an output as one or more signals that may be read by the processor 214. The information may be generated in response to a physical stimulus such as light, sound, pressure, heat, magnetism, motion and/or acceleration. The physical stimulus may be detected as the result of sensing or monitoring the conditions or parameters. The may be provided as an indicator of the sensed condition, parameter or event. In an example, the sensor 209 is configured as any of a temperature sensor, humidity sensor, fire sensor, pressure sensor, smoke sensor, occupancy sensor, air quality sensor, gas sensor, $O_2$, $CO_2$ or CO sensor, accelerometer, velocity sensor, combinations thereof, or other now known or later developed sensors. The sensor 209 may be a micro-electro-mechanical sensors ("MEMS") or larger sensors for sensing any condition or parameter.

The sensor 209 is responsive to the processor 214 and/or logic executed by the processor 214. A signal generated by the sensor 209 may be an indicator of the sensed condition. The signal may be provided to or read by the processor as one or more electrical, electromagnetic, electrochemical, and/or radio frequency signals. The signal may be characterized as an impulse signal, a continuous signal, or discrete time signal. The signal may be an analog or digital signal provided in parallel or serially. The signal carries information or represents a value for a current condition, a past condition, a current change in a condition, a past change in a condition, a comparison of a current condition to a past condition, a comparison of a current condition to a standard, measure, or limit, a comparison of a change in the current condition to a limit, a comparison of the current condition to an extreme limit, a status of the sensor, any combination thereof, and like information that may be provided by sensing a condition or parameter.

Figure 3:
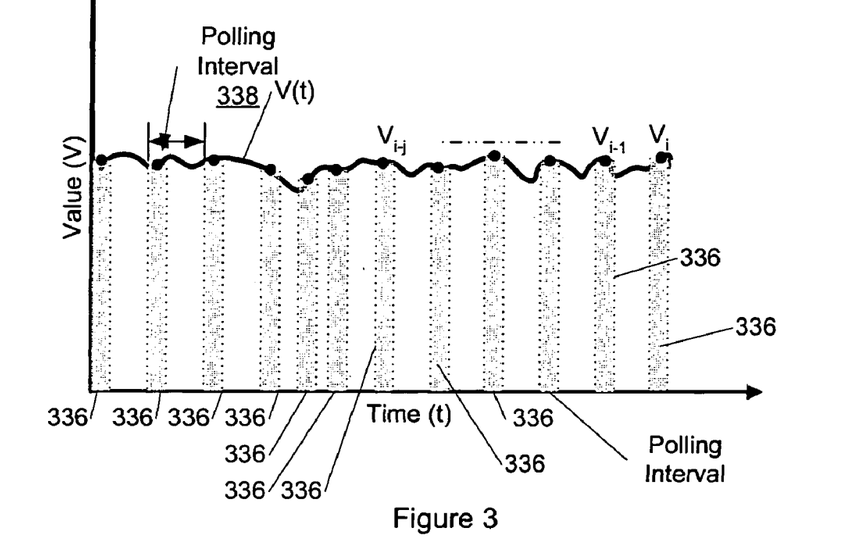
FIG. 3 illustrates a timing chart illustrating the polling interval for a sensor configured for dynamic value reporting.

FIG. 3 illustrates a chart 300 of signal V(t) generated by the sensor 209 representing an indicator of a sensed condition versus time (t). Although the signal is shown as a continuous curve, the signal V(t) may be discrete, or provided during discrete intervals of time.

In an embodiment, the processor 214 polls the sensor 209 during a recurring polling period 336. During a polling period 336, any one or each of the processor 214, the sensor 209 and/or the transceiver 216 may be operable. Each period 336 recurs at a variable frequency or interval 338. The interval 338 may be considered a time beginning at the start of a period 336 and ending at the start of the next consecutive interval 336. A polling period 336 may be a short amount of time relative to the interval 338 or frequency of occurrence of the polling period. For example, a period 336 may extend for several microseconds for an interval 338 of in the range of milliseconds or more, may occur for one or more milliseconds every second or more, a second for every 10 or more seconds or more, or even in the range of minutes every several minutes. The period 336 also may extend for a large or substantial portion of the interval 338. The relationship of the length of a period 336 to the recurrence of an interval 338 or the relationship to the variable interval 338 depends on one or more factors, such as the condition being monitored or sensed, past and current measurements, the control algorithm for the system or device, transmission frequency and strength of the transceiver, response of the sensor, bandwidth, response of a component with which the device 207 is in communication, amount of data to be sensed and/or communicated, power available to the device 207, and any other factors that may contribute to an amount of time and recurrence of the period 336.

A signal V(t) representing the sensed condition may be generated. The signal V(t) may be a continuous or discrete signal representing a current value for the sensed condition, or the status of the condition, during the current interval 336. During a polling period 336, the processor 214 reads the signal V(t) from the sensor 209, and determines value, or most-current indicator $V_i$, for the current sensed condition. For example, the processor 214 may poll or sample the signal from the sensor 209 to read the most current indicator of the sensed condition. The indicator $V_i$ may be a value for the signal V(t) at some point in time during the period 336, such as at the beginning of the period 336, the middle of the period 336, or the end of the period 336. The value $V_i$ may also be an average, a mean, a median, or root mean squared (rms) of the signal V(t) over the period 336. The indicator may be stored in memory 226. The memory may also store prior readings $V_{i-j}$, or indicators read during prior periods 336. Associated timing data or an interval sequence may be stored with the indicator $V_i$ to identify a point in time or interval in which the indicator was read.

Between the intervals 336, the processor 214 may enter a standby or sleep mode, where the processor operates at lower or with very little power consumption. The sensor 209 may also enter a standby or sleep mode between periodic intervals. In the event that the processor 214 is in a sleep mode prior to an polling period 336, the processor 214 will wake up to read or sample the signal V(t) to identify a most current indicator $V_i$ for the sensed condition.

The value $V_i$ is processed by the processor 214 according to a control algorithm to identify whether the sensed condition has changed. For example, the most current indicator $V_i$ may be compared to one or more indicators read during a prior periods $V_{i-j}$. Thus, a change in the sensed condition may be identified by comparing indicators $V_i$ and $V_{i-j}$ read during different periods 336. The change or difference may be compared to a limit. For example, an absolute difference $D_i$ between the indicator $V_i$ for the most current period to the indicator $V_{i-j}$ read during a prior period is determined (e.g. $|V_i-V_{i-j}|$). The current difference $D_i$ is compared to a difference limit $D_l$. The current difference may also be compared to a multiple of the difference limit $D_l$ (e.g., 3×$D_l$) to identify whether an extreme condition may be present, such as a large temperature increase do to a fire. Where the current difference $D_i$ greater than the difference limit $D_l$ (i.e., $D_i>D_l$) the difference between the current value $V_i$ and the value $V_{i-j}$ in the prior interval may be considered outside a control range or band limit.

Similarly, a negative difference between a most current indicator $V_i$ and a prior indicator period $V_{i-j}$ (i.e., $V_i<V_{i-j}$) may be compared to a lower limit LL, and a positive difference between a most current indicator $V_i$ and a prior indicator $V_{i-j}$ (i.e., $V_i>V_{i-j}$) may be compared to an upper limit UL. An absolute value for the lower limit LL may be the same or different than the absolute value for the upper limit UL. The difference may be compared to the LL and UL, and the absolute difference compared to an absolute difference limit $D_i$ to identify changes in the sensed condition. Where a change has been determined, a flag may be set, and/or stored in memory, identifying a change in the sensed condition has been detected. The most current indicator $V_i$ also or alternatively may be compared to a limit $V_{max}$ and/or $V_{min}$. The flag may be set if the most current indicator is determined to be greater than $V_{max}$ or less than $V_{min}$. A time or interval identifier associated with when the flag was set may also be identified and stored in memory.

In an embodiment, the prior interval is a most previous interval where the current indicator $V_i$ is compared to an indicator $V_{i-1}$ read in the most previous period to determine an absolute difference $|V_i-V_{i-1}|$, and/or a difference $V_i-V_{i-1}$. In another embodiment, the current value $V_i$ is compared to a running average or mean $V_{avg}$ of previous values to determine an absolute difference between the current value and the running average.

Figure 4:
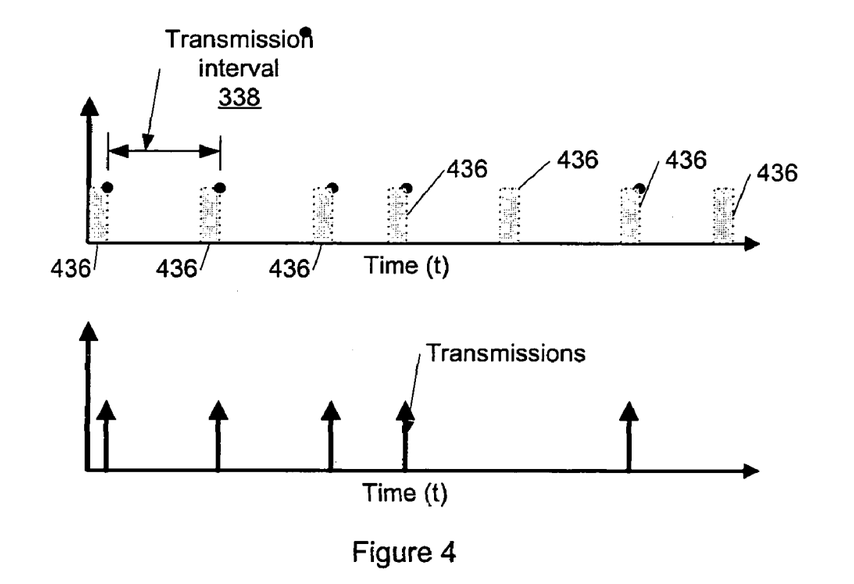
FIG. 4 illustrates a timing chart for the transmission of information for a device configured for dynamic value reporting.

The processor 214 controls the transceiver 216 to selectively communicate information during a period of a transmission interval. FIG. 4 illustrates a transmission interval for a device configured for dynamic value reporting. For example, a processor 214 may control or trigger the transceiver 214 to communicate information during a transmission period 436. The transceiver may communicate the information during the transmission period in response to a triggering event such a detecting whether a flag. The flag may be set in response to detecting or identifying a change in the sensed condition beyond a limit, outside a range, or a reading of an indicator above an upper limit or below a lower limit, or in response to an external stimulus, such as a control signal received by the sensor. The triggering event additionally or alternatively may be the start of the interval, a determination that the current difference $D_i$ exceeds the difference limit $D_l$, the current difference $D_i$ exceeds a multiple of the difference limit $D_l$, the current value $V_i$ exceeds a limit such as $V_{max}$ and/or $V_{min}$, combinations thereof, and the like. Similarly, the processor 214 may control the transceiver 216 to suspend the transmission of information, notwithstanding a flag being set identifying a transmission may be pending. The transceiver may also transmit information in response to a number of successive transmission periods in which information was not transmitted. The event also may be an absence of a value for the sensed condition from the sensor 209.

The transceiver communicates the information as packets of information that are routed over the network. The information may include routing or carrier information for the communication, such as a destination address, packet size, source address and the like. The information may also include one or more of the triggering event, the most current indicator $V_i$, one or more prior indicators current value $V_{i-1}$, $V_{i-j}$, the current difference $D_{i,}$, the difference limit $D_l$, and/or the limits $V_{max}$ and/or $V_{min}$, timing data, and or number of indicators being transmitted, and/or a packet count. The transceiver 216 may communicate the information during each transmission period 436. Alternatively, the transceiver 216 may be controlled to communicate the information in response to a triggering event such as the flag being set. For example, the information may be communicated only during a transmission period 436 for which a change in the sensed condition has been determined. Similarly, the information may be transmitted only after a predetermined number of indicators $V_i$ have been read, or after a predetermined number of indicators associated with a change over a prior indicator $V_i$ have been read. For example, transceiver 216 may transmit information only during a transmission period in which a current difference $D_i$ exceeds the difference limit $D_l$, and may not transmit during intervals in which the current difference $D_i$ does not exceed the difference limit $D_l$. The transceiver 216 also may transmit information in an interval or subsequent interval in which an external control signal is received from another device.

The information may include multiple indicators such as the most current indicator $V_i$ and one or more indicators $V_{i-j}$ read during one or more prior polling periods 336. A counter may count a number of successive polling periods 336 for which a flag or triggering event has not been set, and thus a transmission of information may not have been made. If the counter exceeds a maximum, the transceiver may communicate information such as a current time during a current or successive transmission period. The counter also or alternatively may counter a number of polling intervals when a change has been detected, such as when a flag has been set. When the count reaches a maximum or a limit. The transceiver may be controlled to suspend the transmission of information transmission period, until the counter reaches a send limit. For example, the send limit may be set at five. During each polling period 336 in which a change in the sensed condition is determined, the indicator $V_i$ is stored and the count incremented. The transmission of information is suspended during a transmission period 436 until the counter is increment to the send limit (i.e., 5). When the counter reaches the send limit, each of the five stored indicators $V_i$ are communicated. The information may include timing information or date associated with the indicators $V_i$ and the counter information. Similarly, the information may be transmitted, notwithstanding the status of the counter, in response to other stimulus or determinations.

The most current indicator $V_i$, prior indicators $V_{i-j}$, the differences $D_{i,}$, past differences, the difference limit $D_l$, and/or the limits $V_{max}$ and/or $V_{min}$ may be stored in the storage 228, memory 226, and/or a buffer for the processor. The indicator $V_i$ and limits may be may be stored with associated timing data or information identifying a corresponding time or period in an interval during which the value was or difference was determined. The processor 214 may process consecutive differences $D_i$ and indicators $V_i$ to determine control limits and distribution. For example, an analysis may be performed on the indicators $V_i$ for multiple polling intervals 336. By statistically analyzing consecutive or a series of indicators $V_i$ and differences $D_i$, an estimate for the quality of the control of the sensed condition may be made. For example, a sequence of zero differences or small differences will be associated with a sensed condition that has little or no change over time. Conversely, a series of large differences will be associated with a sensed condition that has greater change over time.

The difference limit $D_l$ may vary according to a determination of the change between differences. For example, when the change between differences $D_i$ to $D_{i-j}$ is minimal or below a predetermined threshold, the difference limit $D_l$ may be reduced. By reducing the difference limit $D_l$, the range in which the value may vary is compressed. With the reduced difference limit $D_l$, the device 207 may detect smaller changes to provide a more robust control of the sensed condition. When the changes between differences $D_i$ to $D_{i-j}$ is large or above a predetermined threshold, the difference limit may be increased.

In addition or alternatively, the variable interval 338 may change in response to a determination of the change between differences. For example, when the change between differences $D_i$ to $D_{i-j}$ is minimal or below a predetermined threshold, the difference limit interval may be extended. That is, the small change between consecutive differences may indicate that the frequency with which sensed condition is monitored may be reduced by extending the interval 338. With the extended interval 338, the device 207 may have a reduced number of communications, and thus energy consumed by and bandwidth used by the device 207 may also be reduced. When the changes between differences $D_i$ to $D_{i-j}$ is large or above a predetermined threshold, the period 338 may be shortened. With the shortened period, the sensor may respond to greater changes in the sensed condition.

The difference limit $D_l$ and the period 338 may also be adjusted in accordance with state of the control algorithm for the system. For example, in a heating, ventilation, and air conditioning system, a temperature sensor may be controlled to ignore greater temperature fluctuations during a ramp-up condition. That is, there may times when the system may be warming up a room from a low temperature to a higher or warmer temperature. Similarly, the room may be cooled down. During these times, there may be greater changes of the temperature between intervals 336. The device may be controlled to compare a value to a larger difference limit $D_l$, to only report information after a predetermined number of intervals, or to report after a difference $D_i$ below a threshold is detected, or other condition when it is appropriate for the device to report a condition.

The difference limit $D_l$ and the period 338 may also be adjusted controlled in accordance a statistical process control algorithm. For example, the difference limit $D_l$ and the period 338 may be controlled according to a Statistical Process Control. The indicators $V_i$ and the differences $D_i$ will vary over time and form. The values $V_i$ and the differences $D_i$ may be plotted as a distribution. The distribution may provide a measure of the dispersion, or spread. For example, a range for the values $V_i$ and the differences $D_i$ (highest to lowest), a mean or average, a mode, and a standard deviation (sigma) may each be determined. The standard deviation may be used to set as an upper limit UL and lower limit LL. A Z-score variable for multiple indicators $V_i$ may be determined and used to identify a tolerance of interval. The statistical analysis may be compared with other statistics or information for reporting the condition (e.g., time of day, occupancy, alarm, failure status, start up). The difference limit $D_l$ and the period may be varied according to an analysis of the dispersion of the values $V_i$ and the differences $D_i$. For example, the difference limit DL may be set to a value associated with three standard deviations from a mean of the differences Di in either direction of the mean to provide an economical measure of control of the condition, while minimizing a risk of reacting to a false signal. Other variable data or attribute data may be used as well. The values may be plotted on a chart, and listed in a table to provide a visual representation of the control of the condition. Using the Statistical Process Control Cpk values may be determined and compared to requirements for controlling the automated process. A reaction plan may be developed to guide the actions and reactions in the event of an out-of-control or out-of-specification condition. Filters such as Finite Impulse Response (FIR) and Infinite Impulse Response (IIR) filters may be applied to screen the information. Frequency response of the process may be determined, such as by using a Fast Fourier transform of for the sensed values or read indicators. Filtered data may be used as a comparison to the most-current indicator $V_i$ to identify changes and whether to set a flag for transmitting information.

Figure 5:
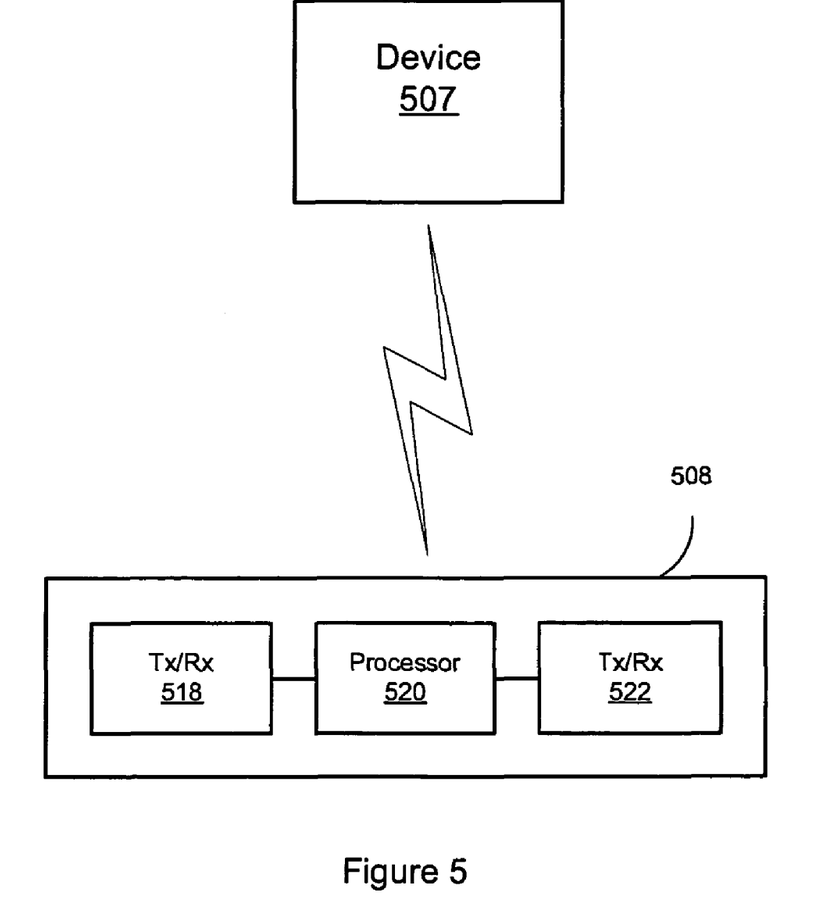
FIG. 5 illustrates sensor device in communication with a controller.

FIG. 5 illustrates an exemplary controller 508 of a building automation system in communication with a device 507. The device 507 is configured for dynamic value reporting as described above with respect to FIGS. 1-4. The controller 508 includes one or more processors 520 and at least one transceiver 518. The controller may also include a second transceiver 522, where a transceiver 518 is communicates over a WFLN and a second transceiver 522 communicates with one or more devices 407. The transceivers 518 and 522 send and receive information to and from the device 507 on the WFLN. The transceivers 518 and 522 may also send and receive information to and from and field panels. The controller 507 may transmit data and information addressed to a specific device 507 according to a binding association. The information may include control instructions, communications settings or other information transmitted from another device 507 or controller. Additional, different or fewer components of the controller 508 may be provided, such as providing a single transceiver operable to transmit and receive pursuant to one or two different communications protocols.

The processor 520 may be an application specific integrated circuit, general processor, digital signal processor, control processor, field programmable gate array, analog circuit, digital circuit, combinations thereof or other now known or later developed device for monitoring, controlling and/or routing. The processor 520 may be a 16, 32 or 64 bit processor operable to route or perform aggregate processing on multiple packets or a packet from multiple data sources. The controller 508 may be configured to interface with the device 507. The controller 508 receives information communicated from the device 507. The controller 508 processes the information according to a control algorithm for the system and for the device 507. The controller 508 may be configured to communicate instructions to the device 507. For example, when a sequence of differences does not change or varies relatively little, the controller 508 may instruct or reprogram the device 507 to a smaller difference limit $D_l$. Similarly, the controller 508 may instruct the device to increase the difference limit D, to ignore the difference limit $D_l$, to increase and/or decrease the polling interval 338 and/or the transmission interval 336.

The controller 508 may also communicate a report instruction to the device 507. In response to a report instruction, the device 507 may wake up from a sleep mode, and sense and report a current indicator $V_i$ or other requested information. The controller 508 may also synchronize the timing of the polling periods 336 and/or transmission periods 436. For example, the controller may communicate synchronization or timing information to the device 507. By communicating the synchronization or timing information, the device 507 and the controller will have synchronized intervals for report and receiving information. The controller 508 may also be configured or programmed to communicate information with other devices in response to the information received from device 507.

The description and illustrations are by way of example only. While the invention has been described above by reference to various embodiments, it should be understood that many changes and modifications can be made without departing from the scope of the invention. Many more embodiments and implementations are possible within the scope of this invention and will be apparent to those of ordinary skill in the art. For example, the various embodiments have a wide variety of applications including integrated building control systems, environmental control, security detection, communications, industrial control, power distribution, and hazard reporting. The wireless device may be synchronized with other devices. The wireless device may be used with integrated systems where, for example, an environmental control system may be integrated with a fire detection and prevention system.

It is intended that the appended claims cover such changes and modifications that fall within the spirit, scope and equivalents of the invention. The invention is not to be restricted except in light as necessitated by the accompanying claims and their equivalents. Therefore, the invention is not limited to the specific details, representative embodiments, and illustrated examples in this description.

I claim:

1. A wireless automation device, comprising:
    a transceiver operable to wirelessly communicate packets of information over a wireless network;
    a sensor operable to generate a indicator for a sensed condition;
    a controller configured to poll the sensor at a polling interval to read the indicator during a current period of the polling interval and to selectively operate the transceiver to communicate information associated reading of the indicator; and
    a memory, the controller storing a reading of the indicator during the current period in the memory, where the memory stores at least one prior reading of the indicator, the prior reading of the indicator made during a prior period of the polling interval,
    wherein the transceiver is configured to transmit a most recent reading of the indicator stored in the memory during a period of a transmission interval in response to detecting a change in the sensed condition outside a predetermined range and wherein transmission of the most recent reading of the indicator stored in the memory during the period of the transmission interval is suspended in response to detecting a chance in the sensed condition within the predetermined range.

2. The wireless automation device of claim 1 where the transceiver transmits a still-alive current data after a predetermined maximum number of successive periods in which the most recent reading of the indicator stored in the memory during a period of the transmission interval is suspended.

3. The wireless automation device of claim 1 where an upper limit and a lower limit of the predetermined range may be varied.

4. The wireless automation device of claim 3 where the upper limit and lower limit may be varied according to an analysis of the most current reading of the indicator and the at least one prior reading of the indicator.

5. The wireless automation device of claim 1 where the transceiver is configured to transmit the most recent reading of the indicator stored in the memory during a period of the transmission interval in response to detecting a sensed condition beyond a band limit.

6. The wireless automation device of claim 5 where an upper band limit and a lower band limit may be varied.

7. The wireless automation device of claim 5 where the upper band limit and lower band limit may be varied according to an analysis of the most current reading of the indicator and the at least one prior reading of the indicator.

8. The wireless automation device of claim 1 where the transceiver is configured to transmit the most recent reading of the indicator stored in the memory in response to an externally-received transmission control signal received over the wireless network.

9. The wireless automation device of claim 1 where the transceiver is configured to transmit the at least one prior reading of the indicator stored in memory at the transmission interval.

10. The wireless automation device of claim 9 where the transceiver is configured to transmit the at least one prior reading of the indicator stored in memory in response to detecting a change in the sensed condition.

11. The wireless automation device of claim 1 where the transmission interval is variable.

12. The wireless automation device of claim 11, where the polling interval is variable.

13. The wireless automation device of claim 12, where the transmission interval and the polling interval vary according to a statistical analysis of the most current reading of the indicator and the at least one prior reading of the indicator.

14. The wireless automation device of claim 1 where the memory stores timing data associated with the most recent reading and the at least one prior reading of the indicator.

15. The wireless automation device of claim 1 where the transceiver is configured to transmit the timing data.

16. The wireless automation device of claim 1 comprising a counter associated with a number of prior readings stored in memory and not yet transmitted.

17. The wireless automation device of claim 16 where the most recent reading of the indicator and the at least one prior reading of the indicator are transmitted in response the counter reaching a maximum count.

18. The wireless automation device of claim 1, where the sensor is configured to sense an environmental condition.

19. The wireless automation device of claim 18, where the communication network comprises automation devices configured as a distributed building automation system.

20. The wireless automation device of claim 1 where the controller is configured to poll the sensor during a period of the transmission interval to read the indicator during a current period of the transmission interval.

21. The wireless automation device of claim 20 where the controller is configured to operate the transceiver to communicate information associated reading of the indicator during the current period of the transmission interval.

* * * * *